(12) United States Patent
Kim et al.

(10) Patent No.: US 10,698,730 B2
(45) Date of Patent: Jun. 30, 2020

(54) NEURAL NETWORK PROCESSOR

(71) Applicant: FuriosaAI Co., Seoul (KR)

(72) Inventors: Hanjoon Kim, Hwaseong-si (KR);
Boncheol Gu, Seongnam-si (KR);
Jeehoon Kang, Seoul (KR);
Changman Lee, Seoul (KR)

(73) Assignee: FuriosaAI Co., Seoul (KR)

( * ) Notice: Subject to any disclaimer, the term of this patent is extended or adjusted under 35 U.S.C. 154(b) by 160 days.

(21) Appl. No.: 16/124,589

(22) Filed: Sep. 7, 2018

(65) Prior Publication Data
US 2019/0303198 A1 Oct. 3, 2019

(30) Foreign Application Priority Data

Apr. 3, 2018 (KR) .................. 10-2018-0038840
May 25, 2018 (KR) .................. 10-2018-0059775

(51) Int. Cl.
G06F 9/48 (2006.01)
G06N 3/063 (2006.01)
G06F 9/54 (2006.01)
G06N 3/08 (2006.01)
G06N 3/04 (2006.01)

(52) U.S. Cl.
CPC ............ *G06F 9/4881* (2013.01); *G06F 9/546* (2013.01); *G06N 3/04* (2013.01); *G06N 3/063* (2013.01); *G06N 3/08* (2013.01)

(58) Field of Classification Search
CPC .................................................. G06F 9/4881
See application file for complete search history.

(56) References Cited

U.S. PATENT DOCUMENTS

| 2004/0268101 | A1  | 12/2004 | Mehta et al. |
| 2009/0150888 | A1* | 6/2009  | Ye .................. G06Q 20/341 718/102 |
| 2010/0332535 | A1* | 12/2010 | Weizman ............ G06F 11/3672 707/770 |
| 2017/0357891 | A1  | 12/2017 | Judd et al. |

FOREIGN PATENT DOCUMENTS

| KR | 10-2011-0037183 A | 4/2011 |
| KR | 10-2013-0090147 A | 8/2013 |
| KR | 10-1803409 B1 | 12/2017 |

OTHER PUBLICATIONS

International Search Report issued in corresponding International Application No. PCT/KR2019/003612 dated Jul. 26, 2019, with translation (5 pages).

* cited by examiner

Primary Examiner — Charlie Sun
(74) Attorney, Agent, or Firm — Osha Liang LLP

(57) ABSTRACT

A processing unit for neural network processing includes: an instruction memory that stores tasks including one or more instructions; a data memory that stores data related to the tasks; a data flow processor that determines whether the data has been prepared for the tasks and notifies a control flow processor that preparations for the tasks have been finished in order of finished data preparation; the control flow processor that controls execution of the tasks in order of notification from the data flow processor; and a functional processor that performs computations resulting from the one or more instructions of the tasks controlled for execution by the control flow processor.

33 Claims, 8 Drawing Sheets

NEURAL NETWORK PROCESSOR

CROSS-REFERENCE TO RELATED APPLICATIONS

This application claims priority to Korean Patent Application Nos. 2018-0038840 and 2018-0059775, filed Apr. 3, 2018, and May 25, 2018, respectively, the contents of which are incorporated herein by reference in their entirety.

BACKGROUND

Technical Field

The present invention relates to a processing unit, system, and method for neural network processing, and more particularly, to a neural network processing unit, system, and method configured to improve a processing speed of an artificial neural network (ANN).

Discussion of Related Art

A human brain has numerous neurons, and intelligence is implemented by electrochemical activities of the neurons. Each neuron is connected to other neurons through synapses, and neurons exchange electrical or chemical signals with each other. Signals that a neuron receives from synapses are converted into electrical signals and stimulate the neuron. Accordingly, a potential of the neuron is increased. When the potential becomes a threshold potential, the neuron generates an action potential to transfer an electrochemical signal to other neurons through synapses.

An ANN is an artificial intelligence implemented by mutually connecting artificial neurons which are mathematically modeled after neurons constituting a human brain. A mathematical model of an artificial neuron is shown in Equation (1) below. Specifically, an artificial neuron receives input signals $x_i$, multiplies each input signal $x_i$ by a corresponding weight $w_i$, and calculates a total sum of the input signals $x_i$. Next, the artificial neuron calculates an activation value by using an activation function and transfers the activation value to artificial neurons connected thereto.

$$y=f(w_1*x_1+w_2*x_2+\ldots w_n*x_n)=f(\Sigma w_i*x_i), \text{ where } i=1,\ldots, \text{ and } n,n=\# \text{ input signal} \quad \text{Equation (1)}$$

In a deep neural network (DNN) which is one kind of ANN, artificial neurons (nodes) have a layered network architecture. The DNN is composed of an input layer, an output layer, and multiple hidden layers between the input layer and the output layer. The input layer is composed of multiple nodes to which an input value is input, and the nodes in the input layer transfer output values calculated through the above mathematical model to nodes of a next hidden layer connected to the input layer. Nodes of the hidden layers receive input values through the above mathematical model, compute output values, and transfer output values to nodes of the output layer.

A computation process of deep learning, which is a form of machine learning performed in a DNN, may be divided into a training process in which a given DNN improves a computation capability thereof by continuously learning training data and an inference process of making an inference from new input data by using the DNN trained through the training process.

The inference process of deep learning is performed by forward propagation in which nodes of the input layer receive input data and then computation is performed in the hidden layers and the output layer according to the sequence of layers. Finally, nodes of the output layer derives a conclusion of the inference process from output values of hidden layers.

On the other hand, in the training process of deep learning, weights of nodes are adjusted to perform training so that difference between the conclusion of the inference process and an actual solution may be reduced. In general, weights are corrected through gradient descent. To implement gradient decent, it is necessary to calculate a differential value of a difference between a conclusion of an inference process and an actual solution with regard to respective weights of nodes. In this process, a differential value of a weight of a front-end node in a DNN is calculated according to the chain rule for a differential value of a weight of a back-end node in the DNN. Since the calculation based on the chain rule is performed in a reverse direction of an inference process direction, a learning process of deep learning involves back propagation.

In other words, a DNN has a hierarchical structure, and nodes present in each layer receive result values from multiple nodes present in a previous layer, output new result values by performing computations on the basis of the above mathematical model of nodes, and transfer the new result values to node in a next layer.

Meanwhile, most computation structures of existing DNNs are decentralized processing structures in which numerous computations performed by nodes present in each layer are distributed to and processed by multiple computation units. However, when computations performed by nodes present in each layer are distributed to and processed by multiple computation units, it is necessary for the respective computation units to perform the computations after receiving all previous computation results required for the computations. Therefore, a computation method in an ANN employing an existing computation processing structure requires a synchronization process in units of layers. In a computation structure of an existing DNN, a synchronization process is performed in a manner in which after it is ensured by a synchronization method that all computations of a previous layer are finished, computations of a next layer are performed.

As described above, although it is natural to apply a data flow method advantageous for parallel processing to a computation processing structure of a DNN, an existing DNN has a computation processing structure optimized for regular computation (serial processing) such as dense matrix multiplication. In other words, a computation processing structure of an existing DNN is a structure optimized for a regular computation method of making operation end times of nodes similar by distributing and assigning similar amounts of tasks to all nodes present in one layer and sequentially starting computations of a next layer by performing a synchronization process when operations of the single layer are finished.

However, since nodes distributed in several layers are independent, the nodes may immediately start computations as long as there are previous results required for the computations performed by the nodes. Therefore, although it is possible to perform computations for nodes of an existing DNN regardless of whether computations of other nodes are finished, it is not possible to start computations until all operations of a previous layer are finished. Also, when some of computation units have not finished all computations assigned thereto, other computation units which have already finished computations should be on standby. As a result, a computation structure of an existing DNN is inefficient for irregular computation (parallel processing) in which nodes process different amounts of computation.

In this regard, irregular computation is frequently performed in a computation process of deep learning. Irregular computation may result from calculation of matrices including multiple values of 0, which does not require calculation, and the like. For convenience of understanding, a DNN whose computation structure is programmed so that all of multiple computation units perform regular computation by processing identical or similar amounts of computation in a distributed manner will be described as an example.

When there is a calculation of a matrix including a value of 0, which does not require calculation, in the example, computation units omit corresponding calculations such that the amounts of computation to be processed by computation units become different from each other, that is, irregular computation is performed. Also, when weights of connections constituting an ANN are sparse, that is, many weights are 0, or a value of 0 is easily generated according to a type of an activation function generated in a processing process of the ANN, irregular computation is frequently performed. Also, when numerous computations are performed by multiple computation units in a distributed manner in a computation process of deep learning and the multiple computation units perform communication for exchanging data with each other in this process, irregular communication is performed due to delays occurring in a communication network and a difference between the delays. In this case, finish times of computations performed by nodes present in one layer of the DNN may become irregular due to irregular computation and irregular communication between computation units. Also, some computation units in one layer may be in an idle state due to some computations which take much time.

Even in the above situation, the existing DNN is configured to wait until all nodes in one layer finish computation and communication and then to process computation of a next layer through a synchronization process. Therefore, according the existing DNN, utilization of nodes is degraded, and overall computation efficiency of the DNN is degraded in the end due to the degradation of node utilization. It is possible to set the synchronization process in units of nodes rather than layers in order to improve computation efficiency of a DNN, but additional cost is required for hardware.

SUMMARY

One or more embodiments of the present invention provide a processing unit, system, and method for neural network processing which are configured to improve a processing speed of an artificial neural network (ANN) where irregular computation is frequently performed.

Exemplary embodiments of the present invention are not limited to those mentioned above, and may be clearly understood by those of ordinary skill in the art to which one or more embodiments of the present invention pertain from the following description.

According to one or more embodiments of the present invention, there is provided a processing unit for neural network processing, the processing unit including: an instruction memory configured to store tasks having one or more instructions; a data memory configured to store data related to the tasks; a data flow engine configured to determine whether data has been prepared for the tasks and notify a control flow engine that preparations for the tasks have been finished in order of finished data preparation; the control flow engine configured to control execution of the tasks in order of notification from the data flow engine; and a functional unit configured to perform computations resulting from the one or more instructions of the tasks controlled for execution by the control flow engine.

The processing unit may further include a data fetch unit configured to fetch computation-target data dependent on the one or more instructions of the tasks controlled for execution by the control flow engine from the data memory to the functional unit.

The control flow engine may store result data of the computations of the functional unit in the data memory.

The processing unit may further include a router configured to relay communication between an external device and the processing unit.

The processing unit may further include a register file configured to have one or more registers which are storage spaces used while the tasks are executed by the control flow engine.

The data memory may include a dynamic memory, and a certain space of the dynamic memory may be configured to be assigned to a specific task and then released when the tasks including the specific task do not use data of the specific task.

The functional unit may be formed in a shape in which computation modules configured to perform the computations form a specific pattern.

The data flow engine may receive indices of the respective tasks and information on data related to the tasks from the instruction memory, determine whether data required for each of the tasks has been prepared, and transmit indices of tasks for which data has been prepared to the control flow engine in order of finished data preparation.

The control flow engine may include: a ready-to-fetch queue configured to receive the indices of the tasks for which data has been prepared from the data flow engine; a fetch block configured to determine whether data required to execute the tasks corresponding to the indices received from the ready-to-fetch queue is present in the data memory, and load the data from outside the processing unit into the data memory when the data is not present in the data memory; a ready-to-run queue configured to receive indices of tasks for which data loading has been finished from the fetch block; a running block configured to sequentially receive the indices of the tasks prepared in the ready-to-run queue from the ready-to-run queue; and a program counter configured to execute one or more instructions of the tasks corresponding to the indices received by the running block.

According to one or more embodiments of the present invention, there is provided a method for neural network processing with a neural network processing unit including an instruction memory configured to store tasks having one or more instructions, a data memory configured to store data related to the tasks, a data flow engine, a control flow engine, and a functional unit, the method including: (i) determining, by the data flow engine, whether data has been prepared for the tasks and notifying the control flow engine that preparations for the tasks have been finished in order of finished data preparation; (ii) controlling, by the control flow engine, the tasks for execution in order of notification from the data flow engine; and (iii) performing, by the functional unit, computations resulting from the one or more instructions of the tasks controlled for execution by the control flow engine.

The neural network processing unit may further include a data fetch unit, and the method may further include, between operation (ii) and operation (iii), fetching, by the data fetch unit, computation-target data dependent on the one or more instructions of the tasks controlled for execution by the control flow engine from the data memory to the functional unit.

The method may further include, after operation (iii), storing, by the control flow engine, result data of the computations of the functional unit in the data memory.

Operation (i) may include: receiving, by the data flow engine, indices of the respective tasks and information on data related to the tasks from the instruction memory; determining, by the data flow engine, whether data required for each of the tasks has been prepared; and transmitting, by the data flow engine, indices of tasks for which data has been prepared to the control flow engine in order of finished data preparation.

The control flow engine may include: a ready-to-fetch queue, a fetch block, a ready-to-run queue, a running block, and a program counter, and operation (ii) may include: receiving, by the ready-to-fetch queue, indices of tasks for which data has been prepared from the data flow engine; when the ready-to-fetch queue sequentially transmits the indices of the tasks to the fetch block, determining, by the fetch block, whether data required to execute the tasks corresponding to the received indices is present in the data memory, and when the data is not present in the data memory, loading the data from outside the neural network processing unit into the data memory; receiving, by the ready-to-run queue, indices of tasks for which data loading has been finished from the fetch block; and when the ready-to-run queue sequentially transmits the indices of the tasks to the running block, executing, by the program counter, one or more instructions of the tasks corresponding to the indices transmitted to the running block.

According to one or more embodiments of the present invention, there is provided a system for neural network processing, the system including: a central processing unit (CPU); and a computing module having at least one processing unit configured to perform processing according to a command of the CPU, wherein the processing unit includes: an instruction memory configured to store tasks having one or more instructions; a data memory configured to store data related to the tasks; a data flow engine configured to determine whether data has been prepared for the tasks and notify a control flow engine that preparations for the tasks have been finished in order of finished data preparation; the control flow engine configured to control execution of the tasks in order of notification from the data flow engine; and a functional unit having one or more computation units configured to perform computations resulting from the one or more instructions of the tasks controlled for execution by the control flow engine.

The processing unit may further include a data fetch unit configured to fetch computation-target data dependent on the one or more instructions of the tasks controlled for execution by the control flow engine from the data memory to the functional unit.

The control flow engine may store result data of the computations of the functional unit in the data memory.

The result data stored in the data memory may be used for processing of the processing unit including the data memory and other processing units.

The system may further include a host interface (I/F) configured to connect the CPU and the computing module so that the CPU and the computing module communicate with each other.

The system may further include a command processor configured to transfer the command of the CPU to the computing module.

The system may further include a memory controller configured to control data transmission and storage of each of the CPU and the computing module.

The processing unit may further include: a router configured to relay communication between an external device and the processing unit; and a register file configured to have one or more registers which are storage spaces used while the tasks are executed by the control flow engine.

The data memory may include a dynamic memory, and a certain space of the dynamic memory may be configured to be assigned to a specific task and then released when the tasks including the specific task do not use data of the specific task.

The functional unit may be formed in a shape in which computation modules configured to perform the computations form a specific pattern.

The data flow engine may receive indices of the respective tasks and information on data related to the tasks from the instruction memory, determine whether data required for each of the tasks has been prepared, and transmit indices of tasks for which data has been prepared to the control flow engine in order of finished data preparation.

The control flow engine may include: a ready-to-fetch queue configured to receive the indices of the tasks for which data has been prepared from the data flow engine; a fetch block configured to determine whether data required to execute the tasks corresponding to the indices received from the ready-to-fetch queue is present in the data memory, and load the data from outside the processing unit into the data memory when the data is not present in the data memory; a ready-to-run queue configured to receive indices of tasks for which data loading has been finished from the fetch block; a running block configured to sequentially receive the indices of the tasks prepared in the ready-to-run queue from the ready-to-run queue; and a program counter configured to execute one or more instructions of the tasks corresponding to the indices received by the running block.

According to one or more embodiments of the present invention, there is provided a method for neural network processing with a neural network processing system including a CPU and a computing module including at least one processing unit configured to perform processing according to a command of the CPU, the processing unit including an instruction memory configured to store tasks having one or more instructions, a data memory configured to store data related to the tasks, a data flow engine, a control flow engine, and a functional unit, the method including: (1) transmitting, by the CPU, a command to the computing module; and (2) performing, by the computing module, processing according to the command of the CPU, wherein operation (2) includes: (2-1) determining, by the data flow engine, whether data has been prepared for the tasks and notifying the control flow engine that preparations for the tasks have been finished in order of finished data preparation; (2-2) controlling, by the control flow engine, the tasks for execution in order of notification from the data flow engine; and (2-3) performing, by the functional unit, computations resulting from the one or more instructions of the tasks controlled for execution by the control flow engine.

The processing unit may further include a data fetch unit, and the method may further include, between operation (2-2) and operation (2-3), fetching, by the data fetch unit, computation-target data dependent on the one or more instructions of the tasks controlled for execution by the control flow engine from the data memory to the functional unit.

Operation (2) may further include, after operation (2-3), storing, by the control flow engine, result data of the computations of the functional unit in the data memory.

The method may further include loading, by the processing unit including the data memory in which the result data is stored and other processing units, the result data.

The method may further include: initializing, by the CPU, a state of the computing module before operation (1); and storing, by the CPU, result data of a computation of the computing module in a storage of the CPU after operation (2).

Operation (2-1) may include: receiving, by the data flow engine, indices of the respective tasks and information on data related to the tasks from the instruction memory; determining, by the data flow engine, whether data required for each of the tasks has been prepared; and transmitting, by the data flow engine, indices of tasks for which data has been prepared to the control flow engine in order of finished data preparation.

The control flow engine may include: a ready-to-fetch queue, a fetch block, a ready-to-run queue, a running block, and a program counter, and operation (2-2) may include: receiving, by the ready-to-fetch queue, indices of tasks for which data has been prepared from the data flow engine; when the ready-to-fetch queue sequentially transmits the indices of the tasks to the fetch block, determining, by the fetch block, whether data required to execute the tasks corresponding to the received indices is present in the data memory, and when the data is not present in the data memory, loading the data from outside the processing unit into the data memory; receiving, by the ready-to-run queue, indices of tasks for which data loading has been finished from the fetch block; and when the ready-to-run queue sequentially transmits the indices of the tasks to the running block, executing, by the program counter, one or more instructions of the tasks corresponding to the indices transmitted to the running block.

BRIEF DESCRIPTION OF THE DRAWINGS

The above features and advantages of one or more embodiments the present invention will become more apparent to those of ordinary skill in the art by describing exemplary embodiments thereof in detail with reference to the accompanying drawings, in which.

DETAILED DESCRIPTION

Figure 1:
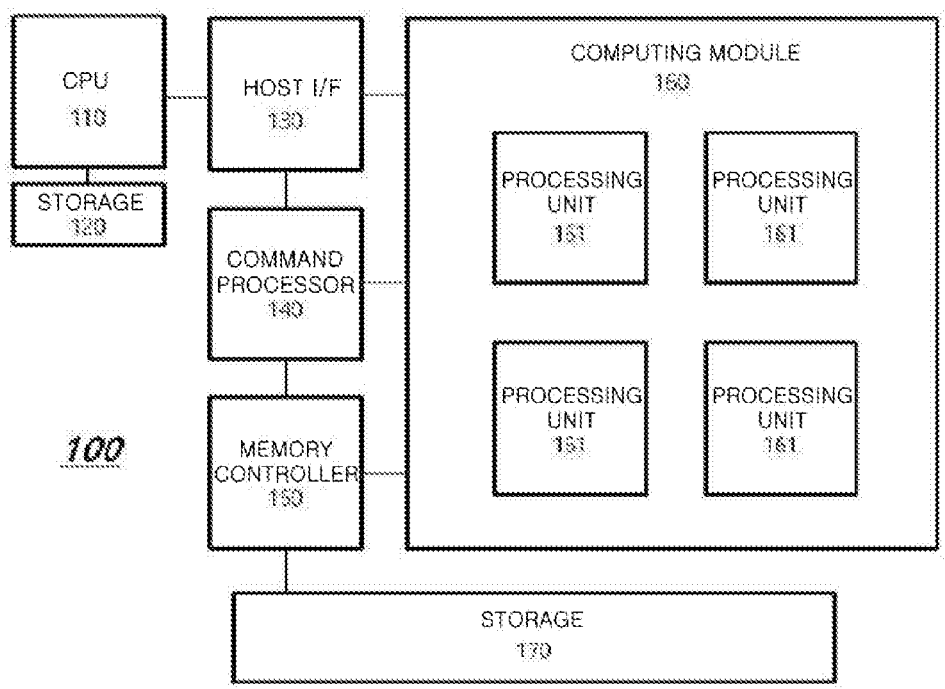
FIG. 1 is a block diagram schematically showing a configuration of a neural network processing system according to one or more embodiments of the present invention.

Hereinafter, one or more embodiments of the present invention will be described in detail with reference to the accompanying drawings. However, embodiments of the present invention may be implemented in various and different forms. Therefore, embodiments disclosed in this specification are not limited to those described herein. Also, the appended drawings are merely intended to facilitate understanding of one or more embodiments disclosed herein, and the technical spirit of the present invention is not limited to the appended drawings. It should be understood that the technical spirit of one or more embodiments of the present invention encompasses all modifications, equivalents, and alternatives falling within the technical sprit and range of the embodiments set forth herein. Parts not related to the clear description of the present invention are omitted from the drawings. The size, form, and shape of each element shown in a drawing may be variously modified, and like reference numerals designate like elements.

As used herein, the suffixes "module," "unit," "processor," "engine," "array," etc. are given or used together for facilitation of the detailed description and do not have meanings or functions different from each other. While describing one or more embodiments of the present invention, when it is determined that a detailed description of a known art related to one or more embodiments may obscure the gist of the embodiments disclosed herein, the detailed description will be omitted.

Throughout this specification, when a part is referred to as "being connected to (accessing, coming in contact with, or being coupled to)" another part, this includes not only "direct connection (access, contact, or coupling)" but also "indirect connection (access, contact, or coupling)" and "electrical connection (access, contact, or coupling)" via an intervening part. Also, when a part is referred to as "including (having or providing)" an element, other elements are not excluded unless explicitly described otherwise, and the part may additionally "include (have, or provide)" other elements.

Terminology used herein is for the purpose of describing one or more embodiments only and is not intended to limit any embodiments of the present invention. The singular forms are intended to include the plural forms as well, unless the context clearly indicates otherwise. Elements that are implemented in a distributed manner may be implemented in combination unless there are particular limitations.

Although terms including ordinal numbers, such as "first," "second," etc., may be used to describe various elements, the elements should not be defined by such terms. Such terms are used only for the purpose of distinguishing one element from another. For example, a first element may be designated a second element without departing from the scope of one or more embodiments of the present invention and, similarly, the second element may also be designated the first element.

Unless otherwise defined, all terms (including technical or scientific terms) used herein have the same meanings as commonly understood by those of ordinary skill in the art to which one or more embodiments disclosed herein pertain. The terms defined in commonly used dictionaries may be interpreted as having the same meanings as the contextual meanings of the related art and will not be interpreted in an idealized or overly formal sense unless clearly so defined herein.

FIG. 1 is a block diagram schematically showing a configuration of a neural network processing system 100 according to one or more embodiments of the present invention.

Referring to FIG. 1, the neural network processing system 100 according to one or more embodiments includes a central processing unit (CPU) 110 and a computing module 160.

The CPU 110 is configured to serve and function as a host which issues various commands to other components including the computing module 160 in the system 100. The CPU 110 may be connected to a storage 120 and may also have an additional storage therein. According to performance functions, the CPU 110 may be referred to as a host, and the storage 120 connected to the CPU 110 may be referred to as a host memory.

The computing module 160 is configured to receive a command of the CPU 110 and perform a specific function such as a computation. Also, the computing module 160 includes one or more processing units 161 configured to perform processing in an artificial neural network (ANN) according to the command of the CPU 110. For example, the computing module 160 may have 4 to 4096 processing units 161, but the number of processing units 161 is not limited thereto. In other words, the number of processing units 161 that the computing module 160 has may be less than 4 or greater than 4096.

The computing module 160 may also be connected to a storage 170 and may have an additional storage therein. The processing units 161 of the computing module 160 will be described in detail below with reference to FIG. 2.

The storages 120 and 170 may be dynamic random access memories (DRAMs) but the storages 120 and 170 are not limited thereto. The storages 120 and 170 may be implemented in any form of storage for storing data.

Referring back to FIG. 1, the neural network processing system 100 may further include a host interface (I/F) 130, a command processor 140, and a memory controller 150.

The host I/F 130 is configured to connect the CPU 110 and the computing module 160 and allows communication between the CPU 110 and the computing module 160.

The command processor 140 is configured to receive the command from the CPU 110 through the host I/F 130 and transfer the command to the computing module 160.

The memory controller 150 is configured to control data transmission and data storage of each of the CPU 110 and the computing module 160 or between the CPU 110 and the computing module 160. For example, the memory controller 150 may control computation results and the like of the processing units 161 to be stored in the storage 170 of the computing module 160.

Specifically, the host I/F 130 may have a control and status register. By using the control and status register, the host I/F 130 provides status information of the computing module 160 to the CPU 110 and provides an I/F for transferring a command to the command processor 140. For example, the host I/F 130 may generate peripheral component interconnect express (PCIe) packets for transmitting data to the CPU 110 and transfer the PCIe packets to the destination, or the host I/F 130 may forward packets received from the CPU 110 to a designated address.

The host I/F 130 may have a direct memory access (DMA) engine to transmit a large number of packets without intervention of the CPU 110. The host I/F 130 may read a large amount of data from the storage 120 or transmit data to the storage 120 due to a request of the command processor 140.

Also, the host I/F 130 may have a control and status register which may be accessed through a PCIe I/F. In a booting process of the system 100 according to one or more embodiments, the host I/F 130 is assigned a physical address of the system 100 (PCIe enumeration). The host I/F 130 may read or write data from or in a space of the control and status register by performing functions of loading, storage, etc. on the register through a part of the assigned physical address. Status information of the host I/F 130, the command processor 140, the memory controller 150, and the computing module 160 may be stored in registers of the host I/F 130.

In FIG. 1, the memory controller 150 is located between the CPU 110 and the computing module 160, but this is not necessarily so. For example, the CPU 110 and the computing module 160 may each have different memory controllers or may be each connected to different memory controllers.

In the neural network processing system 100, a specific operation such as image discrimination may be described as software and stored in the storage 120 and may be executed by the CPU 110. In a program execution process, the CPU 110 may load weights of a neural network from a separate storage device (a hard disk drive (HDD), a solid-state drive (SSD), or the like) into the storage 120 and load the weights into the storage 170 of the computing module 160 again. Likewise, the CPU 110 may read image data from a separate storage device, load the image data into the storage 120, and store the image data in the storage 170 of the computing module 160 after partially converting the image data.

Subsequently, the CPU 110 may command the computing module 160 to read the weight and the image data from the storage 170 of the computing module 160 and perform an inference process of deep learning. Each processing unit 161 of the computing module 160 may perform processing according to a command of the CPU 110. After the inference process is finished, results thereof may be stored in the storage 170. The CPU 110 may command the command processor 140 to transmit the results from the storage 170 to the storage 120, and finally, the results may be transmitted to software used by a user.

Figure 2:
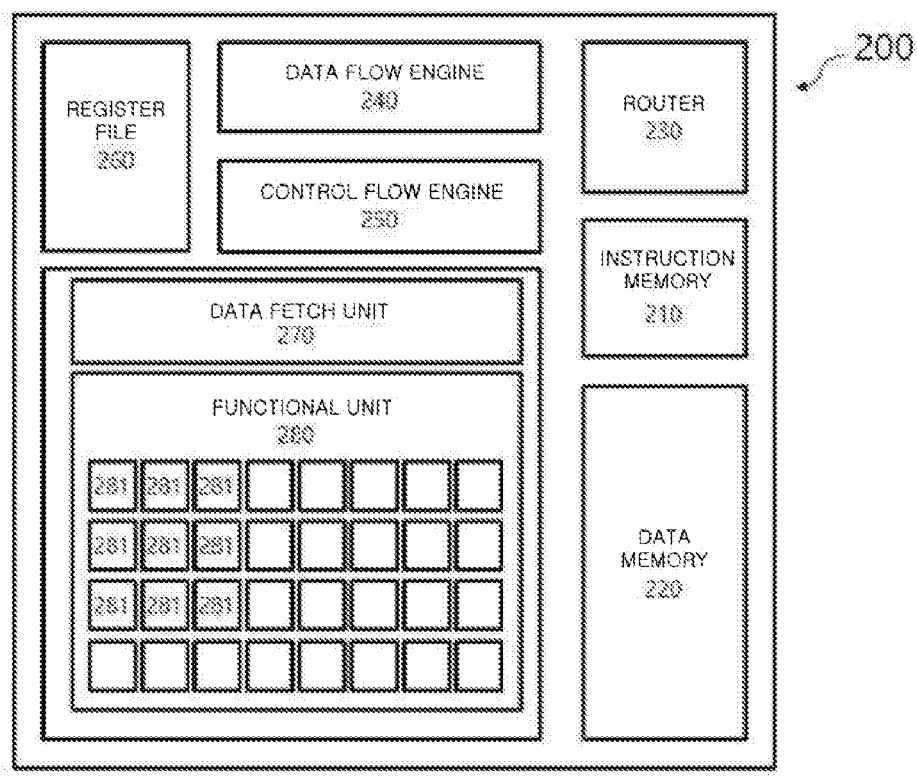
FIG. 2 is a block diagram illustrating in detail a configuration of a processing unit shown in FIG. 1.

FIG. 2 is a block diagram illustrating in detail a configuration of a processing unit 161 shown in FIG. 1.

Referring to FIG. 2, a processing unit 200 according to one or more embodiments may include an instruction memory 210, a data memory 220, a data flow engine 240, a control flow engine 250, and a functional unit 280. Also, the processing unit 200 may further include a router 230, a register file 260, and a data fetch unit 270.

The instruction memory 210 is configured to store one or more tasks. The tasks may be composed of one or more instructions. The instructions may be codes in the form of commands but are not limited thereto. The instructions may be stored in the storage 170 connected to the computing module 160, the storage provided in the computing module 160, and the storage 120 connected to the CPU 110.

Tasks described in this specification denote execution units of a program in the processing unit 200, and instructions are elements which are generated as computer commands and constitute a task. One node in an ANN performs a complex computation such as $f(\Sigma w_i \times x_i)$, and such a computation may be performed through several tasks in a distributed manner. For example, all computations performed by one node in an ANN may be performed through one task, or a computation performed by multiple nodes in an ANN may be performed through one task. A command to perform such a computation may be composed of instructions.

For convenience of understanding, a case in which a task is composed of a plurality of instructions and each instruction is configured as a code in the form of a computer command will be described as an example. In this example, a program counter 255 of the control flow engine 250, which will be described below, analyzes a code of each instruction by sequentially executing the plurality of instructions that the task has. In this specification, such a process is referred to as "executing a task" or "executing instructions of a task." A mathematical operation dependent on a code analyzed by the program counter 255 may be performed by the functional unit 280, which will be described below, and an operation performed by the functional unit 280 is referred to as a "computation" in this specification.

The data memory 220 is configured to store data related to tasks. Here, the data related to tasks may be input data, output data, weights, or activations which are used to execute the tasks or perform computations for the tasks, but is not limited thereto.

The router 230 is configured to perform communication between components constituting the neural network processing system 100 and serves as a relay between components constituting the neural network processing system 100. For example, the router 230 may relay communication between processing units or communication between the command processor 140 and the memory controller 150. The router 230 may be provided in the processing unit 200 in the form of a network on chip (NOC).

The data flow engine 240 is configured to determine whether data has been prepared for tasks and notify the control flow engine 250 that data preparations for the tasks have been finished in order of finished data preparation.

The control flow engine 250 is configured to control execution of tasks in order of notification from the data flow engine 240. Also, the control flow engine 250 may perform calculations, such as addition, subtraction, multiplication, and division, caused by executing instructions of tasks.

The data flow engine 240 and the control flow engine 250 will be described in further detail below.

The register file 260 is a storage space which is frequently used by the processing unit 200 and includes one or more registers used while codes are executed by the processing unit 200.

The data fetch unit 270 is configured to fetch the functional unit 280 computation-target data dependent on one or more instructions of a task controlled for execution by the control flow engine 250 from the data memory 220. Also, the data fetch unit 270 may fetch the same or different pieces of computation-target data to a plurality of computation modules 281 included in the functional unit 280.

The functional unit 280 is configured to perform a computation resulting from the one or more instructions of the task controlled for execution by the control flow engine 250 and to include one or more computation modules 281 which actually perform the computation. Each of the computation modules 281 is configured to perform mathematical operations, such as addition, subtraction, multiplication, and multiply and accumulate (MAC). The functional unit 280 may be formed in a shape in which the computation modules 281 have a specific unit interval or form a specific pattern. When the computation modules 281 are formed into such an array, the computation modules 281 of the array may process complex computations such as matrix computations at the same time by performing the computations in parallel.

FIG. 2 shows that the functional unit 280 is separated from the control flow engine 250, but the processing unit 200 may be implemented in a form in which the functional unit 280 is included in the control flow engine 250.

Result data of computations of the functional unit 280 may be stored in the data memory 220 by the control flow engine 250. Here, the result data stored in the data memory 220 may be used for processing of the processing unit 200 including the data memory 220 and other processing units. For example, result data of computation of a functional unit in a first processing unit may be stored in a data memory of the first processing unit, and the result data stored in the data memory of the first processing unit may be used by a second processing unit.

With the above-described neural network processing system 100 and the processing unit 200 included therein, it is possible to implement an apparatus and method for processing data in an ANN and a computation device and method in an ANN.

Figure 3:
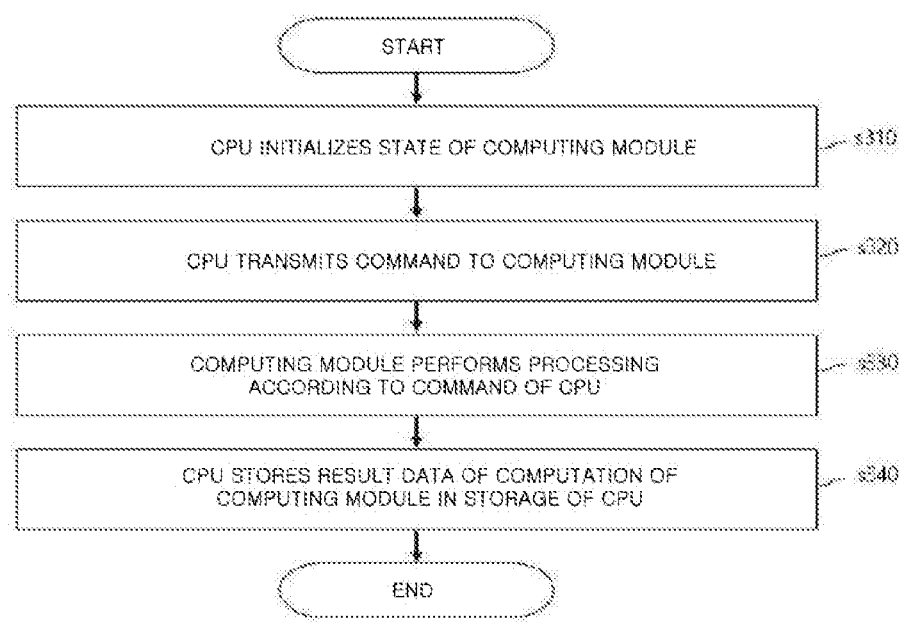
FIG. 3 is a flowchart illustrating a procedure of a neural network processing method in which the neural network processing system shown in FIG. 1 is used.

FIG. 3 is a flowchart illustrating a procedure of a neural network processing method performed by the neural network processing system 100 and the processing unit 200 included therein according to one or more embodiments of the present invention.

Referring to FIG. 3, the neural network processing method according to one or more embodiments may include an operation in which the CPU 110 initializes a state of the computing module 160 (s310), an operation in which the CPU 110 transmits a command to a specific component so that the computing module 160 may perform a specific function (s320), an operation in which the computing module 160 performs processing according to the command of the CPU 110 (s330), and an operation in which the CPU 110 saves results stored in the storage 170 of the computing module 160 to the storage 120 (s340). The operations s310 to s340 will be described in further detail below.

According to the neural network processing method of one or more embodiments, first, the CPU 110 may initialize a state of the computing module 160 (s310). Here, the CPU 110 may command the command processor 140 to initialize the state of the computing module 160 through the host I/F 130.

Next, the CPU 110 may transmit a command to a specific component so that the computing module 160 may perform a specific function (s320). For example, the CPU 110 may transmit a command to the command processor 140 to load one or more instructions present in the storage 120 into an instruction memory 210 of at least one processing unit 200.

Here, the CPU 110 may command the command processor 140 to save data present in the storage 120 to the storage 170 of the computing module 160 through the memory controller 150. Also, the CPU 110 may transfer at least one of one or more weights and an address of an input value to a task stored in the instruction memory 210 of the processing unit 200, thereby commanding the computing module 160 to start processing. Here, the one or more weights and the address of the input value may have been stored in the storage 170 of the computing module 160 or the storage 120 of the CPU 110.

Next, the computing module 160 performs processing according to the command of the CPU 110 (s330). Here, the processing unit 200 may perform data processing and computation according to the one or more given instructions and store the results in the storage 170 of the computing module 160 through the memory controller 150.

Next, the CPU 110 saves the results stored in the storage 170 of the computing module 160 to the storage 120 (s340).

The storage operation may be performed when the CPU 110 issues a command to the command processor 140.

The above-described operations s310 to s340 may not be performed in sequence. The sequence of operations may differ from the above, and the respective operations may be performed almost at the same time.

Since the operation in which the CPU 110 initializes the state of the computing module 160 (s310) and the operation in which the CPU 110 saves results stored in the storage 170 of the computing module 160 to the storage 120 (s340) are not essential operations, the neural network processing method according to one or more embodiments may be implemented to include the operations s320 and s330 only.

Figure 4:
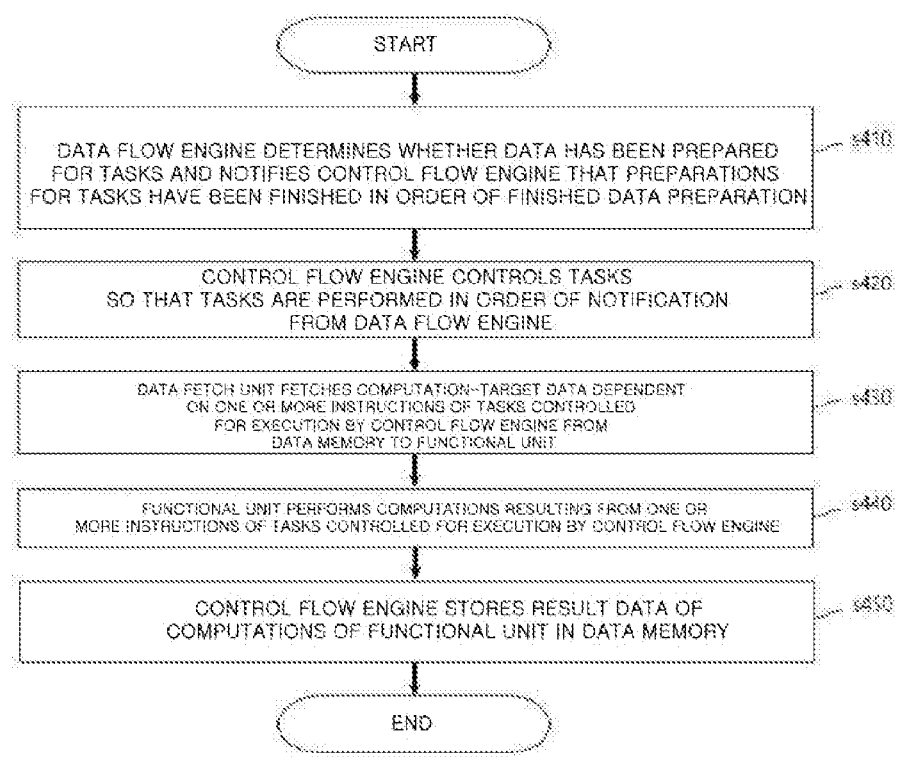
FIG. 4 is a flowchart illustrating a procedure of a neural network processing method in which the processing unit shown in FIG. 2 is used.

FIG. 4 is a flowchart illustrating a procedure of a neural network processing method employing the processing unit 200 shown in FIG. 2.

Referring to FIGS. 2 and 4, a neural processing method according to one or more embodiments includes an operation in which the data flow engine 240 determines whether data has been prepared for tasks and notifies the control flow engine 250 that preparations for the tasks have been finished in order of finished data preparation (s410), an operation in which the control flow engine 250 controls the tasks for execution in order of notification from the data flow engine 240 (s420), and an operation in which the functional unit 280 performs computations resulting from one or more instructions of the tasks controlled for execution by the control flow engine 250 (s440).

In addition, the neural processing method may include an operation in which the data fetch unit 270 fetches computation-target data dependent on the one or more instructions of the tasks controlled for execution by the control flow engine 250 from the data memory 220 to the functional unit 280 (s430) between the operation s420 and the operation s440, and the neural processing method may include an operation in which the control flow engine 250 stores result data of computation of the functional unit 280 in the data memory 220 (s450) after the operation s440.

Specifically, according to a data flow method, when one task receives all data (e.g., operands) required to execute instructions thereof from other components and finishes preparation to execute the instructions, the task may perform its next processing procedure regardless of whether data has been prepared for other tasks as described in the operation s410.

On the other hand, according to a von-Neumann method (a control flow method), instructions of each task may be sequentially executed by the program counter 255 of the control flow engine 250 as described above in the operation s420.

The aforementioned data flow method denotes a method in which processing elements are not limited to any sequence and separately perform their computations when only data required for the computations is prepared. Also, the von-Neumann method denotes that computation devices perform computations according to a predetermined computation sequence.

For convenience of understanding, a case, in which there is a task having an index of number 0, a task having an index of number 1, and a task having an index of number 2, will be described as an example. In this example, when data required to execute task number 2 is prepared, the data flow engine 240 which uses the data flow method transmits the index of task number 2 to the control flow engine 250 regardless of whether data required to execute task number 0 and task number 1 has been prepared. On the other hand, in the same example, when the index of task number 2, the index of task number 1, and the index of task number 0 are received in sequence from the data flow engine 240, the control flow engine 250 which uses the von-Neumann method executes task number 2 first, task number 1 second, and task number 0 last.

In this regard, it is natural for a neural network including nodes which perform numerous separate computations to adopt a computation processing structure employing the data flow method advantageous for a parallel processing structure in order to improve computation efficiency. Unlike the von-Neumann method, when the data flow method is applied to computation of a neural network, irregular parallel computation processing is allowed such that computation efficiency is improved. However, when a computation processing structure is totally designed for the data flow method, computations which are favorably executed in sequence require considerable time for determining whether data required for each computation has been prepared, and thus unnecessary overhead occurs.

Therefore, according to one or more embodiments of the present invention, the data flow engine 240 uses the data flow method, thus transmitting information of a specific task to the control flow engine 250 regardless of sequence or whether other tasks have been prepared when all data required for the task is prepared. As a result, since whether to execute a single task is determined independently from whether data has been prepared for other tasks, it is possible to improve a processing speed and an execution speed of tasks from an overall processing view point.

Also, according to one or more embodiments of the present invention, the control flow engine 250 uses the control flow method, thus causing instructions in tasks received from the data flow engine 240 to be performed in order of received information on the tasks. Therefore, with the control flow engine 250 according to or more embodiments of the present invention, it is possible to prevent overhead which may occur when it is determined whether data has been prepared for each instruction in a task in order to execute the instructions according to the data flow method.

As described above, according to one or more embodiments of the present invention, the data flow method and the control flow method are used together to perform computations in an ANN. Therefore, it is possible to overcome a limitation that the control flow method is disadvantageous for irregular computation and to remove overhead which may be caused by the data flow method. Consequently, a processing speed of an ANN may be improved, and it is possible to reduce a time taken in the learning, training, and inference processes of deep learning.

The operations s410 to s450 illustrated in FIG. 4 may correspond to a detailed process included in the operation of FIG. 3 in which the computing module 160 performs processing according to a command of the CPU 110 (s330).

Figure 5:
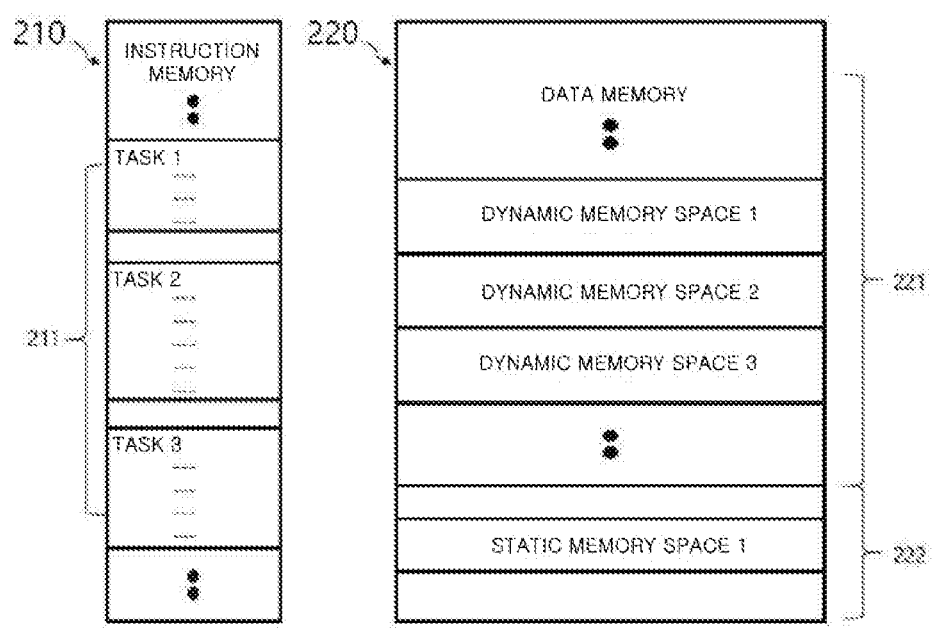
FIG. 5 is a diagram illustrating in detail an instruction memory and a data memory shown in FIG. 2.

FIG. 5 is a diagram illustrating the instruction memory 210 and the data memory 220 shown in FIG. 2 in detail.

As described above with reference to FIG. 2, the instruction memory 210 is a space in which one or more instructions are stored, and tasks 211 composed of a plurality of instructions may be stored therein.

The data memory 220 includes a dynamic memory 221 and a static memory 222. The dynamic memory 221 is a memory which is dynamically allocated to a task currently executed by the control flow engine 250. The static memory 222 is a memory which has been allocated irrespective of execution and completion of a task when a program is loaded into the data memory 220.

Meanwhile, each of the tasks 211 uses a certain dynamic memory space allocated from the dynamic memory 221 of the data memory 220. Also, each of the tasks 211 may be assigned data, which is used without release, from a partial space of the static memory 222 and use the data.

A task which uses a dynamically allocated memory space may transfer data present in the dynamic memory space to other tasks so that the other tasks may use the data, and in this case, a value of a reference count increases. The reference count denotes the number of tasks that refer to and use data of a task which uses a dynamically allocated memory. When tasks which receive the data finish using the data (i.e., computations of the tasks are finished) or the data is copied, the value of the reference count decreases.

For example, a required dynamic memory space may be allocated by the control flow engine 250 from the dynamic memory 221 of the data memory 220 to a task, and the dynamically allocated memory may be transferred to other tasks in the form of a value or a reference. Here, the tasks which receive the memory use the memory and then transfer acknowledgements to the task to which the dynamic memory space has been allocated first from the dynamic memory 221, thereby reducing a reference count. Accordingly, the data memory 220 may release the memory dynamically allocated to tasks at a point in time when the reference count becomes 0.

As described above, a certain space of the dynamic memory 221 may be allocated to a specific task and released when tasks including the specific task do not use data of the specific task.

Figure 6:
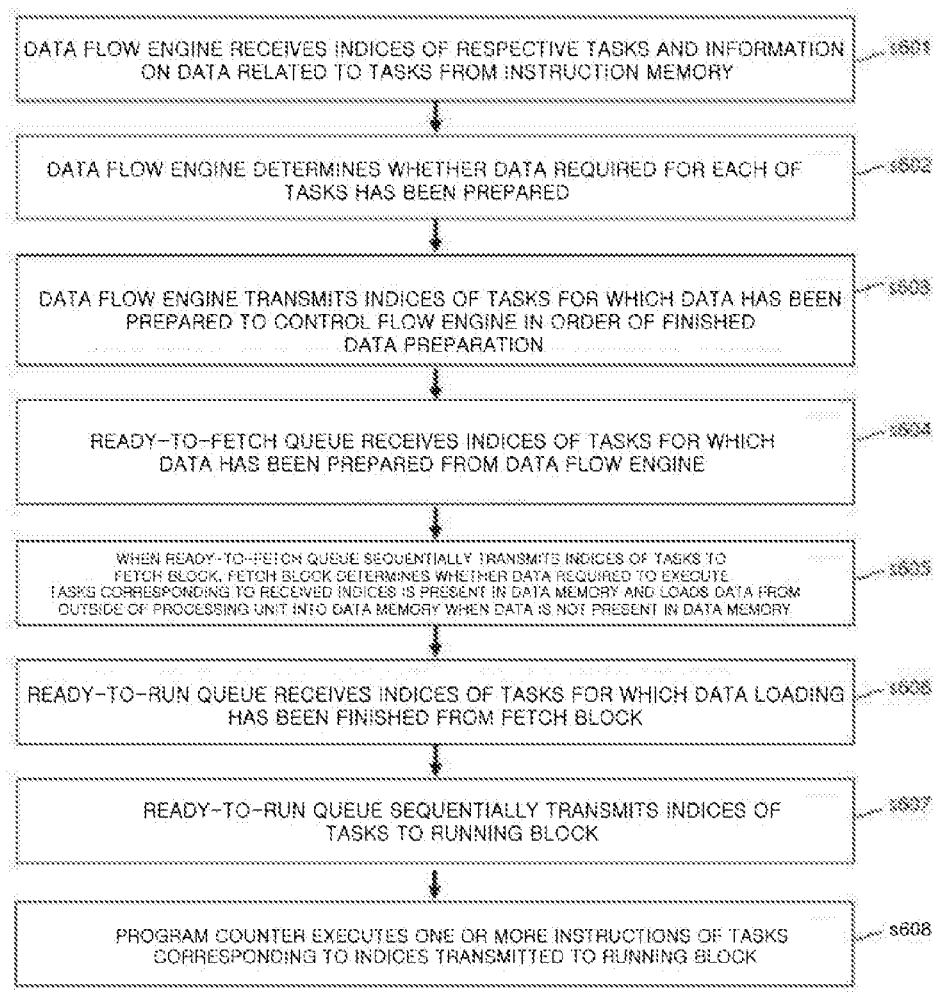
FIG. 6 is a flowchart illustrating an implementation example of a detailed procedure of the neural network processing method shown in FIG. 4.

FIG. 6 is a flowchart illustrating an implementation example of a detailed procedure of the neural network processing method shown in FIG. 4.

Referring to FIGS. 4 and 6, the operation s410 shown in FIG. 4 may include an operation in which the data flow engine 240 receives indices of the respective tasks and information on data related to the tasks from the instruction memory 210 (s601), an operation in which the data flow engine 240 determines whether data required for each of the tasks has been prepared (s602), and an operation in which the data flow engine 240 transmits indices of tasks for which data has been prepared to the control flow engine 250 in order of finished data preparation (s603).

The operation s420 performed thereafter may include an operation in which a ready-to-fetch queue 251 receives the indices of tasks for which data has been prepared from the data flow engine 240 (s604), an operation in which when the ready-to-fetch queue 251 sequentially transmits the indices of the tasks to a fetch block 252, the fetch block 252 determines whether data required to execute the tasks corresponding to the received indices is present in the data memory 220, and when the data is not present in the data memory 220, the fetch block 252 loads the data from outside the processing unit 200 into the data memory 220 (s605), an operation in which a ready-to-run queue 253 receives indices of tasks for which data loading has been finished from the fetch block 252 (s606), an operation in which the ready-to-run queue 253 sequentially transmits the indices of the tasks to a running block 254 (s607), and an operation in which the program counter 255 executes one or more instructions of the tasks corresponding to the indices transmitted to the running block 254 (s608). In the operation s607, the running block 254 sequentially receives the indices of the tasks prepared in the ready-to-run queue 253 from the ready-to-run queue 253, and then in the operation s608, the program counter 255 executes one or more instructions of the tasks corresponding to the indices transmitted to the running block 254.

Referring to the neural network processing method shown in FIG. 4, after the above-described operations s601 to s608, it is possible to perform the operation in which the data fetch unit 270 fetches the functional unit 280 computation-target data dependent on one or more instructions of tasks controlled for execution by the control flow engine 250 from the data memory 220 (s430), an operation in which the functional unit 280 performs computations resulting from the one or more instructions of the tasks controlled for execution by the control flow engine 250 (s440), and an operation in which the control flow engine 250 stores result data of computation of the functional unit 280 in the data memory 220 (s450).

In addition, the processing unit 200 including the data memory 220 in which the result data of computation of the functional unit 280 is stored and other processing units may load and use the result data of computation of the functional unit 280 for their processing.

Figure 7:
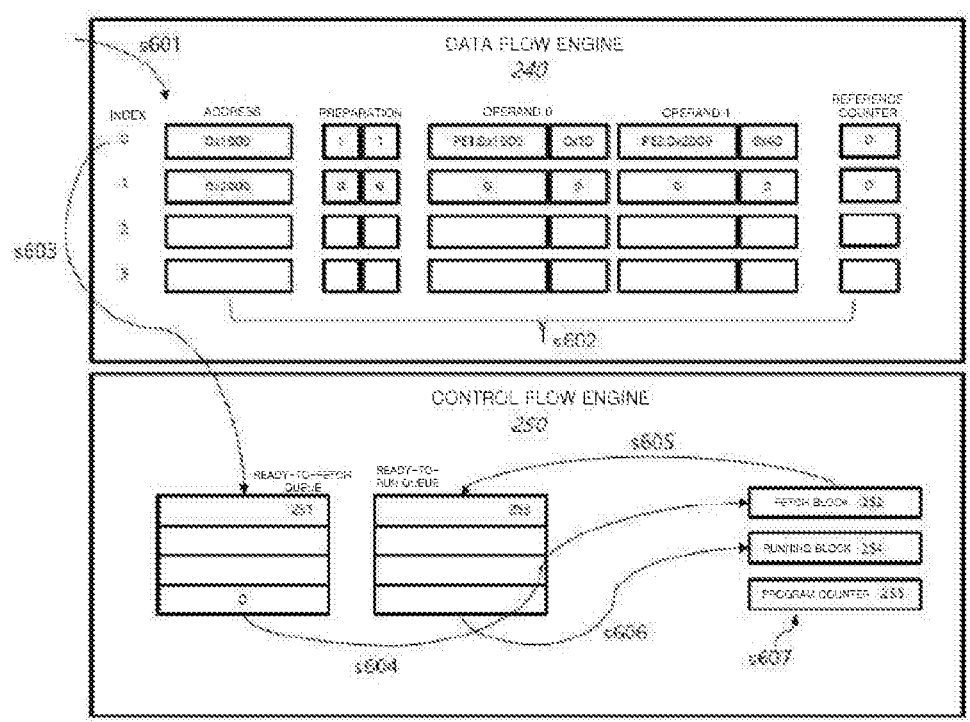
FIG. 7 is a diagram illustrating in detail detailed configurations of a data flow engine and a control flow engine shown in FIG. 2.

FIG. 7 is a diagram illustrating in detail detailed configurations of the data flow engine 240 and the control flow engine 250 shown in FIG. 2.

Referring to FIGS. 6 and 7 together, the data flow engine 240 manages states of tasks (indices of 0, 1, 2, . . . ). For example, the data flow engine 240 receives indices of respective tasks and information on data related to the tasks from the instruction memory 210 (s601) and determines whether data required for each of the tasks has been prepared (s602). Here, the data flow engine 240 may receive addresses of data required to execute the tasks from a separate storage.

When all data required for one task is prepared, the data flow engine 240 transmits information on the task which has been prepared to the ready-to-fetch queue 251 (s603). Here, the data flow engine 240 may transmit only indices of the tasks for which preparations have been finished to the ready-to-fetch queue 251.

Subsequently, the control flow engine 250 processes the tasks in the ready-to-fetch queue 251 in a first-in first-out (FIFO) manner. The control flow engine 250 transmits an index of a first task in a sequence of the ready-to-fetch queue 251 (e.g., a task disposed in a lowermost queue of FIG. 7) to the fetch block 252. And then, the dynamic memory 221 of the data memory 220 allocates a memory required for the task corresponding to the index transmitted to the fetch block 252 to the control flow engine 250. Subsequently, the control flow engine 250 performs data loading for the task to which a certain space of the dynamic memory 221 has been allocated (s604). Here, the data loading denotes that the control flow engine 250 determines whether data required to execute the task is in the data memory 220 and brings the data or loads the data from an external device (another processing unit, a storage, etc.) into the data memory 220 when the data is not in the data memory 220.

Subsequently, the control flow engine 250 transmits indices of tasks, for which data loading into the fetch block 252 has been finished, to the ready-to-run queue 253 (s605). Then, the ready-to-run queue 253 sequentially transfers indices of the tasks present therein to the running block 254 (s606). One or more instructions of the tasks corresponding to the indices transmitted to the running block 254 are sequentially executed by the program counter 255 according to the von-Neumann method (s607).

Since multiple tasks may be assigned to the ready-to-fetch queue 251 and the ready-to-run queue 253 shown in FIG. 7, each of the ready-to-fetch queue 251 and the ready-to-run queue 253 may have 1 to 128 blocks, or more, to which tasks are assigned.

For convenience of understanding, a case will be described as an example in which multiple instructions composed of codes in the form of commands (multiplication, addition, etc.) are included, there is a task having an index of number 0, and instructions of task number 0 are separately stored in spaces corresponding to address numbers, such as 1000, 1004, 1008, etc., of the instruction memory 210.

In the above example, when all data required for task number 0 is prepared, the data flow engine 240 transmits an index of task number 0 to the control flow engine 250. At this time, the control flow engine 250 may find that instructions of task number 0 are present at address numbers of 1000, 1004, and 1008 in the instruction memory 210 from information that the data flow engine 240 already possesses. Subsequently, the control flow engine 250 brings an instruction of task number 0 from the address number of 1000 in the instruction memory 210 to execute the instruction, and then brings instructions of task number 0 from the address numbers of 1004 and 1008 in the instruction memory 210 to execute the instructions. At this time, an address number which is currently executed by the control flow engine 250 may be assigned to the program counter 255.

Also, computation-target data dependent on instructions executed by the control flow engine 250 may be stored in the data memory 220. Subsequently, the data fetch unit 270 may bring the computation-target data and fetch the computation-target data to each of one or more computation modules 281 provided in the functional unit 280, and the computation modules 281 may perform mathematical operations for the computation-target data.

In addition, the control flow engine 250 may store result data of computation of the functional unit 280 in the data memory 220, and the result data may thereafter be used for a task which requires the result data. Also, the data flow engine 240 or a data flow engine of another processing unit may determine whether data has been prepared for a task which requires the result data stored in the data memory 220.

With reference to the above description, a detailed implementation example of a series of operations performed by the data flow engine 240 and the control flow engine 250 according to one or more embodiments of the present invention will be described below.

First, the processing unit 200 receives data information packets from an outside thereof (a storage thereof, an external storage connected thereto, another processing unit, or a command processor). Each of the data information packets may include at least one of an address (or an identity (ID)) of a destination task, addresses of operands, and a source address of data. The data flow engine 240 of the processing unit 200 updates an operand state of the task which corresponds to the destination of the received data information packets. In this way, the data flow engine 240 may manage an operand state of the task, whether data has been prepared, and the source address of the data.

Subsequently, the data flow engine 240 receives the data information packets and determines the operand state of the task. When all operands required for the task have been prepared, the data flow engine 240 transmits an index of the task to the ready-to-fetch queue 251 of the control flow engine 250.

Subsequently, the control flow engine 250 pops and transmits an index of a first task in a sequence of the ready-to-fetch queue 251 to the fetch block 252. Also, the dynamic memory 221 of the data memory 220 allocates a memory required for the task corresponding to the index transmitted to the fetch block 252 to the control flow engine 250. Here, the control flow engine 250 may read data of the task corresponding to the index transmitted to the fetch block 252 from operand information stored in the data flow engine 240. Since the operand information includes the source address of the data, the control flow engine 250 transmits a read request packet to the source address of the data. The read request packet may be transferred to another processing unit, a memory controller of a computing module, or a memory controller of a host according to the source address. When the read source address indicates the processing unit 200 including the control flow engine 250, the control flow engine 250 may omit data transmission.

Subsequently, when a read response to the read request packet, which is transmitted by the control flow engine 250 to the task corresponding to the index transmitted to the fetch block 252, is received, the processing unit 200 stores the read response in the allocated dynamic memory. The control flow engine 250 transmits an index of a task, for which all read responses to all read request packets transmitted by the control flow engine 250 have been received, to the ready-to-run queue 253. After that, the fetch block 252 may repeatedly perform the above described process.

Then, the control flow engine 250 pops and transmits an index of a leading task in a sequence of the ready-to-run queue 253 to the running block 254. Also, the control flow engine 250 may read an address of the task corresponding to the index transmitted to the running block 254 in the instruction memory 210 from the data flow engine 240 and put the address into the program counter 255. Subsequently, the control flow engine 250 reads one or more instructions of the task from the instruction memory 210 and executes the instructions to execute the task. The program counter 255 increases a reference count as much as the number of instructions included in the task and executes all the instructions of the task. In the execution process, the control flow engine 250 may store a computation result of the task in the data memory 220 and transfer the computation result stored in the data memory 220 to a pre-designated next computation-target task through data information packets. The processing unit 200 which receives the data information packets may continuously perform the above-described process.

Although the above operations have been described on the basis of one processing unit, all processing units of the computing module 160 may separately perform the above process. Also, the above operations may not be sequentially performed and may be performed almost at the same time.

Figure 8:
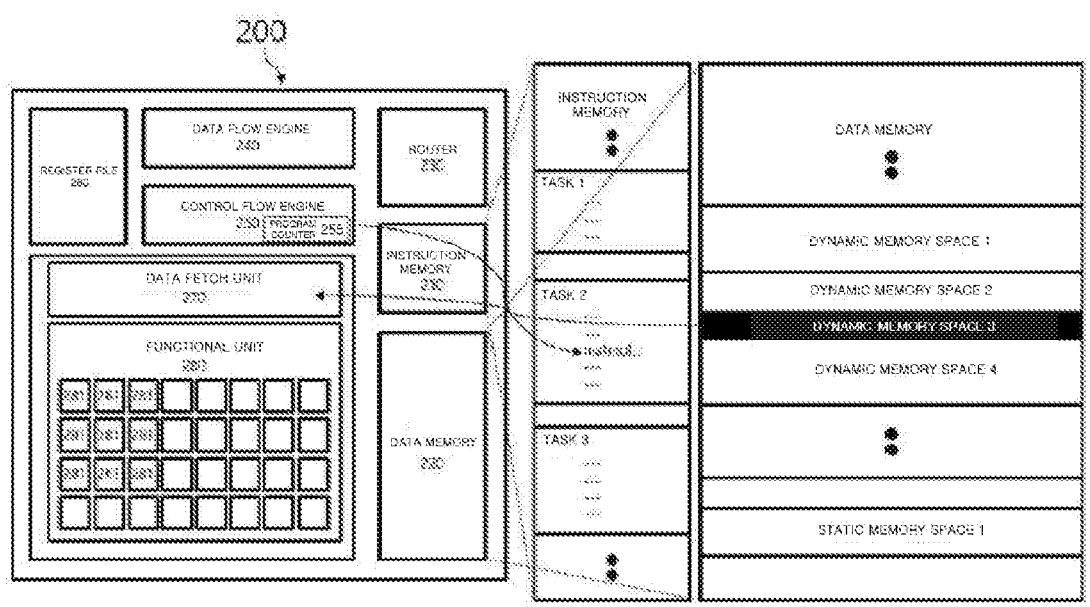
FIG. 8 is a diagram illustrating interactions between the control flow engine and the instruction memory shown in FIG. 2 and interactions between a data fetch unit and the data memory shown in FIG. 2.

FIG. 8 is a diagram illustrating interactions between the control flow engine 250 and the instruction memory 210 and interactions between the data fetch unit 270 and the data memory 220.

Referring to FIG. 8, it is possible to see that the program counter 255 of the control flow engine 250 may bring a command of an instruction corresponding to a specific address number from the instruction memory 210 in the example described above with reference to FIG. 7. Also, it is possible to see that in the same example, the data fetch unit 270 may fetch the functional unit 280 computation-target data resulting from execution of a task stored in the data memory 220, and each of the plurality of computation modules 281 performs a computation dependent on the computation-target data.

Meanwhile, while the control flow engine 250 controls a task so that the task is executed, the executed task may transmit data to another task, and in this case, a reference count may increase as described above. Computation results are generated in the process in which the control flow engine 250 controls the task so that the task may be executed. The data transmission is intended to simply build a programming model by supporting allocation and release of a dynamic memory through hardware when tasks exchange data with each other according to one or more embodiments.

For example, when a neural network processing system is implemented so that sequential computations are processed by a plurality of tasks in a distributed manner, the control flow engine 250 may cause a task to receive computation results generated in a process of controlling a previous task so that the previous task may be executed and may cause the task receiving the computation results to perform a next computation. When computation results are obtained from the process in which the control flow engine 250 executes a task, the control flow engine 250 immediately transfers the computation results to other tasks which require the computation results, and the other tasks receiving the computation results may perform next computations such that a computation processing speech of the processing unit 200 may be improved.

According to one or more embodiments of the present invention, to improve a processing speed and an execution speed of tasks from an overall processing view point, the data flow method is used until an operation in which a data flow engine determines whether data preparations for tasks have been finished and transmits determination results to a control flow engine so that tasks may be executed. Also, according to one or more embodiments of the present invention, the von-Neumann method may be used in an operation in which the control flow engine controls execution of tasks which are required to be executed in sequence and an operation of executing the tasks, in order to remove overhead caused by the data flow method.

According to one or more embodiments of the present invention, each of tasks, which are processing execution units in an ANN, may perform a next processing procedure regardless of whether data preparations for other tasks have been finished when data required to execute the task is prepared. Accordingly, it is possible to improve utilization of a processing unit which is in charge of processing tasks.

According to one or more embodiments of the present invention, instructions of tasks for which data preparations have been finished are sequentially performed, and thus it is possible to prevent overhead which is caused when the instructions of the tasks are executed according to the data flow method.

According to one or more embodiments of the present invention, it is possible to improve a processing speed of an ANN in which irregular computation is frequently performed by using a neural network processing unit and system to which the data flow method and the control flow method are applied together. Accordingly, it is possible to reduce a time taken in the learning, training, and inference processes of deep learning.

Effects of one or more embodiments of the present invention are not limited to those mentioned above, and it should be understood that the effects of the present invention include all effects that can be inferred from the detailed description or the claims.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A processing unit for neural network processing, the processing unit comprising:
   an instruction memory that stores tasks including one or more instructions;
   a data memory that stores data related to the tasks;
   a data flow processor that determines whether the data has been prepared for the tasks and notifies a control flow processor that preparations for the tasks have been finished in order of finished data preparation;
   the control flow processor that controls execution of the tasks in order of notification from the data flow processor; and
   a functional processor that performs computations resulting from the one or more instructions of the tasks controlled for execution by the control flow processor.

2. The processing unit of claim 1, further comprising a data fetch processor that fetches computation-target data dependent on the one or more instructions of the tasks controlled for execution by the control flow processor from the data memory to the functional processor.

3. The processing unit of claim 1, wherein the control flow processor further stores result data of the computations of the functional processor in the data memory.

4. The processing unit of claim 1, further comprising a router that relays communication between an external device and the processing unit.

5. The processing unit of claim 1, further comprising a register file that includes one or more registers, wherein the one or more registers are used as storage spaces while the tasks are executed by the control flow processor.

6. The processing unit of claim 1, wherein
   the data memory includes a dynamic memory, and
   a portion of the dynamic memory is assigned to a specific task and then released when the tasks, including the specific task, do not use data of the specific task.

7. The processing unit of claim 1, wherein the data flow processor further:
   receives from the instruction memory:
   first indices of the tasks, and
   information on the data related to the tasks, and
   determines whether data required for each of the tasks has been prepared, and
   transmits second indices of the tasks where the required data has been prepared to the control flow processor in the order of finished data preparation.

8. The processing unit of claim 7, wherein the control flow processor further includes:
   a ready-to-fetch queue that receives the second indices from the data flow processor;
   a fetch block that:
   determines whether data required to execute the tasks corresponding to the second indices is present in the data memory, and
   loads the data required to execute the tasks from outside the processing unit into the data memory when the data required to execute the tasks is not present in the data memory;
   a ready-to-run queue that receives third indices of tasks where data loading has been finished from the fetch block;
   a running block that sequentially receives the third indices from the ready-to-run queue; and a program counter that executes the one or more instructions of the tasks corresponding to the third indices received by the running block.

9. The processing unit of claim 1, wherein the functional processor comprises computation modules that perform the computations and are formed in a specific pattern.

10. A method of performing neural network processing with a neural network processing unit including an instruction memory that stores tasks having one or more instructions, a data memory that stores data related to the tasks, a data flow processor, a control flow processor, and a functional processor, the method comprising:
    determining, by the data flow processor, whether the data has been prepared for the tasks and notifying the control flow processor that preparations for the tasks have been finished in order of finished data preparation;
    controlling, by the control flow processor, execution of the tasks in order of notification from the data flow processor; and
    performing, by the functional processor, computations resulting from the one or more instructions of the tasks controlled for execution by the control flow processor.

11. The method of claim 10, wherein
    the neural network processing unit further includes a data fetch processor, and
    the method further comprising, between the determining and the controlling:
        fetching, by the data fetch processor, computation-target data dependent on the one or more instructions of the tasks controlled for execution by the control flow processor from the data memory to the functional processor.

12. The method of claim 10, further comprising, after performing the computations:
    storing, by the control flow processor, result data of the computations of the functional processor in the data memory.

13. The method of claim 10, wherein the determining of whether the data has been prepared for the tasks and notifying that preparations for the tasks have been finished in order of finished data preparation further includes:
    receiving, by the data flow processor, from the instruction memory:
        first indices of the respective tasks, and
        information on the data related to the tasks;
    determining, by the data flow processor, whether data required for each of the tasks has been prepared; and
    transmitting, by the data flow processor, second indices of tasks where the required data has been prepared to the control flow processor in the order of finished data preparation.

14. The method of claim 10, wherein
    the control flow processor includes a ready-to-fetch queue, a fetch block, a ready-to-run queue, a running block, and a program counter, and
    the controlling of the execution of the tasks in the order of notification further includes:
        receiving, by the ready-to-fetch queue, the second indices from the data flow processor;
        when the ready-to-fetch queue sequentially transmits the second indices to the fetch block:
            determining, by the fetch block, whether data required to execute the tasks corresponding to the received second indices is present in the data memory, and
            when the data required to execute the tasks is not present in the data memory, loading, by the fetch block, the data required to execute the tasks from outside the neural network processing unit into the data memory;
        receiving, by the ready-to-run queue, third indices of tasks where the data loading has been finished from the fetch block; and
        when the ready-to-run queue sequentially transmits the third indices to the running block:
            executing, by the program counter, the one or more instructions of the tasks corresponding to the third indices transmitted to the running block.

15. A system for neural network processing, the system comprising:
    a central processing unit (CPU); and
    a computing module having at least one processing unit that performs processing according to a command of the CPU,
    wherein the processing unit includes:
        an instruction memory that stores tasks having one or more instructions; and
        a data memory that stores data related to the tasks
        a data flow processor that determines whether the data has been prepared and notifies a control flow processor that preparations for the tasks have been finished in order of finished data preparation;
        the control flow processor that controls execution of the tasks in order of notification from the data flow processor; and
        a functional processor that performs computations resulting from the one or more instructions of the tasks controlled for execution by the control flow processor.

16. The system of claim 15, wherein the at least one processing unit further includes a data fetch processor that fetches computation-target data dependent on the one or more instructions of the tasks controlled for execution by the control flow processor from the data memory to the functional processor.

17. The system of claim 15, wherein the control flow processor further stores result data of the computations of the functional unit in the data memory.

18. The system of claim 17, wherein the result data stored in the data memory is used for processing of the processing unit including the data memory and processing of other processing units of the system.

19. The system of claim 15, further comprising a host interface that connects the CPU and the computing module so that the CPU and the computing module communicate with each other.

20. The system of claim 15, further comprising a command processor that transfers the command of the CPU to the computing module.

21. The system of claim 15, further comprising a memory controller that controls data transmission and storage of the CPU and the computing module.

22. The system of claim 15, wherein the processing unit further includes:
    a router that relays communication between an external device and the processing unit; and
    a register file that includes one or more registers, the one or more registers are used as storage spaces while the tasks are executed by the control flow processor.

23. The system of claim 15, wherein
    the data memory includes a dynamic memory, and
    a portion of the dynamic memory is assigned to a specific task and then released when the tasks, including the specific task, do not use data of the specific task.

24. The system of claim 15, wherein the functional processor includes computation modules that perform the computations and are formed in a specific pattern.

25. The system of claim 15, wherein the data flow processor further:
receives from the instruction memory:
first indices of the tasks, and
information on the data related to the tasks, and
determines whether data required for each of the tasks has been prepared, and
transmits second indices of the tasks where data has been prepared to the control flow processor in the order of finished data preparation.

26. The system of claim 25, wherein the control flow processor includes:
a ready-to-fetch queue that receives the second indices from the data flow processor;
a fetch block that:
determines whether data required to execute the tasks corresponding to the second indices is present in the data memory, and
loads the data required to execute the tasks from outside the processing unit into the data memory when the data required to execute the tasks is not present in the data memory;
a ready-to-run queue that receives third indices of tasks where data loading has been finished from the fetch block;
a running block that sequentially receives the third indices from the ready-to-run queue; and
a program counter that executes the one or more instructions of the tasks corresponding to the third indices received by the running block.

27. A method of performing neural network processing with a neural network processing system including a central processing unit (CPU) and a computing module including at least one processing unit that performs processing according to a command of the CPU, the processing unit including an instruction memory that stores tasks having one or more instructions and a data memory that stores data related to the tasks, a data flow processor, a control flow processor, and a functional processor, the method comprising:
transmitting, by the CPU, a command to the computing module; and
performing, by the computing module, processing according to the command of the CPU,
wherein the performing of the processing according to the command of the CPU comprises:
determining, by the data flow processor, whether the data has been prepared for the tasks and notifying the control flow processor that preparations for the tasks have been finished in order of finished data preparation;
controlling, by the control flow processor, execution of the tasks in order of notification from the data flow processor; and
performing, by the functional processor, computations resulting from the one or more instructions of the tasks controlled for execution by the control flow processor.

28. The method of claim 27, wherein
the processing unit further includes a data fetch processor, and
the method further comprising, between the determining and the controlling, fetching, by the data fetch processor, computation-target data dependent on the one or more instructions of the tasks controlled for execution by the control flow processor from the data memory to the functional processor.

29. The method of claim 27, wherein after the performing of the computations resulting from the one or more instructions of the tasks controlled for execution, the control flow processor stores result data of the computations of the functional processor in the data memory.

30. The method of claim 29, further comprising loading, by the processing unit including the data memory where the result data is stored and by other processing units of the neural network processing system, the result data.

31. The method of claim 27, further comprising:
initializing, by the CPU, a state of the computing module before transmitting the command to the computing module; and
storing, by the CPU, result data of a computation of the computing module in a storage of the CPU after the performing of the processing, by the computing module, according to the command of the CPU.

32. The method of claim 27, wherein the determining whether the data has been prepared for the tasks and notifying that preparations for the task have been finished in order of the finished data preparation further comprises:
receiving, by the data flow processor, from the instruction memory:
first indices of the respective tasks, and
information on the data related to the tasks;
determining, by the data flow processor, whether data required for each of the tasks has been prepared; and
transmitting, by the data flow processor, second indices of tasks where the required data has been prepared to the control flow processor in the order of finished data preparation.

33. The method of claim 27, wherein
the control flow processor further includes a ready-to-fetch queue, a fetch block, a ready-to-run queue, a running block, and a program counter, and
the controlling of the execution of the tasks in the order of notification further includes:
receiving, by the ready-to-fetch queue, the second indices from the data flow processor;
when the ready-to-fetch queue sequentially transmits the second indices to the fetch block:
determining, by the fetch block, whether data required to execute the tasks corresponding to the received second indices is present in the data memory, and
when the data required to execute the tasks is not present in the data memory, loading, by the fetch block, the data required to execute the tasks from outside the processing unit into the data memory;
receiving, by the ready-to-run queue, third indices of tasks where the data loading has been finished from the fetch block; and
when the ready-to-run queue sequentially transmits the third indices to the running block:
executing, by the program counter, the one or more instructions of the tasks corresponding to the third indices transmitted to the running block.

* * * * *